US011613171B2

(12) United States Patent
Linner

(10) Patent No.: US 11,613,171 B2
(45) Date of Patent: Mar. 28, 2023

(54) TOP COMPRISING A CABLE GUIDE

(71) Applicant: Webasto SE, Stockdorf (DE)

(72) Inventor: Nikolaus Linner, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 315 days.

(21) Appl. No.: 16/864,264

(22) Filed: May 1, 2020

(65) Prior Publication Data

US 2020/0353801 A1 Nov. 12, 2020

(30) Foreign Application Priority Data

May 8, 2019 (DE) ...................... 10 2019 111 971.5

(51) Int. Cl.
*B60J 7/16* (2006.01)
*B60J 7/057* (2006.01)
*B60J 7/04* (2006.01)

(52) U.S. Cl.
CPC ............. *B60J 7/0573* (2013.01); *B60J 7/041* (2013.01); *B60J 7/1692* (2013.01)

(58) Field of Classification Search
CPC ...... B60J 7/1226; B60J 7/1265; B60J 7/1692; B60R 16/0215; B60R 16/0222
USPC ............................ 296/107.09, 107.07, 107.12
See application file for complete search history.

(56) References Cited

U.S. PATENT DOCUMENTS

| 5,769,144 | A | * | 6/1998 | Carter | ................ | A44B 13/0076 |
| | | | | | | 411/338 |
| 8,791,367 | B2 | * | 7/2014 | Hartman | ............... | H05K 7/1491 |
| | | | | | | 174/152 G |
| 2003/0098171 | A1 | * | 5/2003 | Sato | .................... | B60R 16/0222 |
| | | | | | | 174/663 |
| 2022/0093293 | A1 | * | 3/2022 | Kiyota | ................. | H01B 17/586 |

FOREIGN PATENT DOCUMENTS

| DE | 195 18 070 A1 | 11/1996 | |
| DE | 10 2007 033 270 A1 | 1/2009 | |
| DE | 102012001313 A1 | * 9/2012 | ......... B60R 16/0222 |
| DE | 102015107565 A1 | * 11/2016 | ............ F16G 11/025 |
| JP | H0660242 U | * 8/1994 | |
| JP | 3152062 B2 | * 4/2001 | |
| JP | 3969426 B2 | * 9/2007 | |
| JP | 2009016182 A | * 1/2009 | ......... B60R 16/0222 |

OTHER PUBLICATIONS

Machine translation JP-2009016182.*
Machine translation DE-102015107565.*

* cited by examiner

*Primary Examiner* — D Glenn Dayoan
*Assistant Examiner* — Kevin P Weldon
(74) *Attorney, Agent, or Firm* — Fitch, Even, Tabin & Flannery, LLP

(57) ABSTRACT

A top of a convertible vehicle having a top linkage which can be displaced between a closed position, in which the top covers a vehicle interior, and a storage position, in which the vehicle interior is uncovered, and which has a linkage arrangement on either side of a vertical longitudinal center (Continued)

plane of the top, each linkage arrangement having a link and a cable guide disposed on the link and serving to guide a tensioning cable. The cable guide may have two shells defining a passage opening and being in contact with the link from opposite sides.

11 Claims, 4 Drawing Sheets

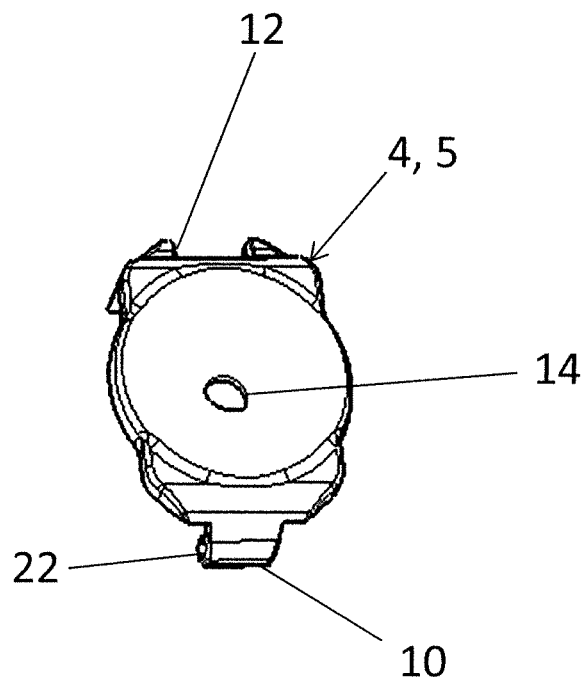
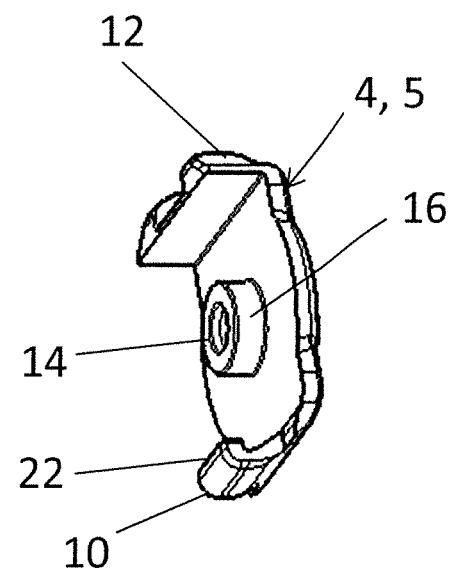
Fig. 5
Fig. 6
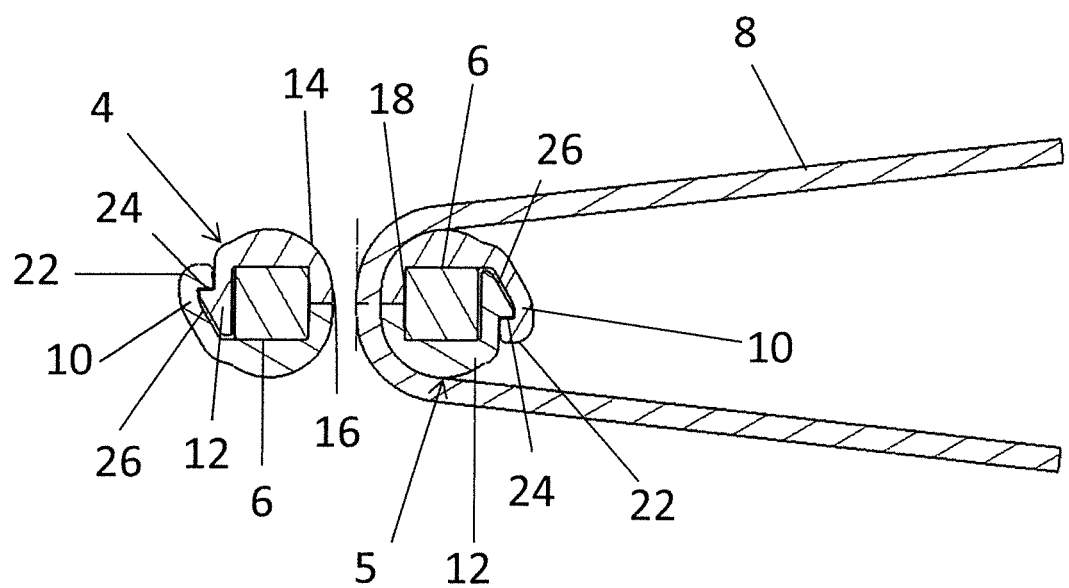
Fig. 7

TOP COMPRISING A CABLE GUIDE

CROSS-REFERENCE TO RELATED APPLICATION

This application claims priority from German Patent Application Number DE 10 2019 111 971.5, filed May 8, 2019, which is hereby incorporated herein by reference in its entirety for all purposes.

FIELD

The invention relates to a top of a convertible vehicle having the features of the preamble of claim 1.

BACKGROUND

A top of this kind is known from practice and comprises a top linkage which can be displaced between a closed position, in which the top covers a vehicle interior, and a storage position. The vehicle interior is uncovered when the top is in the storage position. The top linkage comprises a linkage arrangement on either side of a vertical longitudinal center plane of the top, each linkage arrangement comprising a link having a cut-out and a cable guide disposed on the link and serving to guide a tensioning cable. The cable guide of the top known from practice is a hollow rivet press-fit into a through hole of the link. Press-fitting the hollow rivet into the through hole requires significant effort and special tools, and the cut-out has to be easily accessible. Furthermore, the geometrical design options of the hollow rivet are limited.

SUMMARY

The object of the invention is to provide a top comprising a cable guide that is easily installed in a short amount of time.

According to the invention, this object is attained by the top having the features of claim 1.

So the top according to the invention comprises a top linkage which can be displaced between a closed position, in which the top covers a vehicle interior, and a storage position. The vehicle interior is uncovered when the top is in the storage position. The top linkage comprises a linkage arrangement on either side of a vertical longitudinal center plane of the top, each linkage arrangement having a link and a cable guide for guiding a tensioning cable. The cable guide is disposed on the link and comprises two shells defining a passage opening for the tensioning cable. The shells are in contact with the link from opposite sides.

Thus, the design options for the passage opening are extended compared to the top described above. Connecting the cable guide to the link is made easier.

In a preferred embodiment of the top according to the invention, the two shells are connected to each other, in particular latched or clipped to each other. This allows the cable guide to be quickly fixed to the link without additional securing elements.

In an exemplary embodiment of the top according to the invention, the link comprises a cut-out, portions of the shell that define the passage opening, in particular cylindrical portions, extending into the cut-out. The cut-out of the link is a through hole, for example.

A surface portion of the cable guide can form a sliding surface for the tensioning cable. Preferably, the sliding surface has low roughness, i.e., it is smooth. Thus, the tensioning cable is subject to only low wear due to friction between the tensioning cable and the cable guide. This prolongs the service life of the tensioning cable.

In a preferred embodiment of the top according to the invention, the sliding surface of the cable guide is curved, the curvature radius being selected as large as possible. This allows the tensioning cable to withstand even great forces without wearing through or snapping.

The two shells of the cable guide are identical parts, for example. This reduces the number of different parts, meaning lower production costs for the cable guide.

In an exemplary embodiment of the top according to the invention, each of the two shells comprises a latching part and a latching counterpart. The latching part of the first shell engages with the latching counterpart of the second shell and the latching part of the second shell engages with the latching counterpart of the first shell. Accordingly, the two shells can be connected to each other without needing any additional securing elements or tools. So the cable guide is easy to install on the link, making installation costs low.

The latching parts can each comprise a latching lug. Protrusions can be formed on the latching counterparts. The latching lug of a mating latching part engages behind the protrusion, connecting the shells to each other.

Also, the latching counterparts can each comprise a ramp, the mating latching lug driving onto said ramp during installation of the cable guide on the link. So when the shells are moved toward each other during installation, the latching lugs are bent by the ramps in such a manner that the shells can continue to be moved toward each other. Once the latching lugs have reached the respective protrusions, they return to their original position. There, the latching lugs engage behind the respective protrusions, latching the shells to each other and securing the cable guide to the link.

In a preferred embodiment of the top according to the invention, each shell is an injection-molded plastic part. Injection-molded plastic parts can be produced with high precision in a short amount of time. Surfaces of injection-molded parts can be configured almost freely and thus be adapted to specific requirements. Moreover, tools for injection-molding can be reused. This means that the shells can be produced with high precision at low cost.

In an exemplary embodiment of the top according to the invention, a headliner or a top cover can be tensioned by means of the tensioning cable.

Other advantages and advantageous embodiments of the subject matter of the invention are apparent from the description, the drawing and the claims.

BRIEF DESCRIPTIONS OF THE DRAWINGS

An exemplary embodiment of a top according to the invention is illustrated in the drawing in a schematically simplified manner and will be explained in more detail in the following description.

FIG. 5 shows a perspective detail view of a shell of a cable guide of the top according to the invention;

FIG. 6 shows another perspective detail view of the shell of FIG. 5; and

FIG. 7 shows a section through a link, a cable guide and a tensioning cable along line VII-VII in FIG. 3.

DETAILED DESCRIPTION

Figure 1:
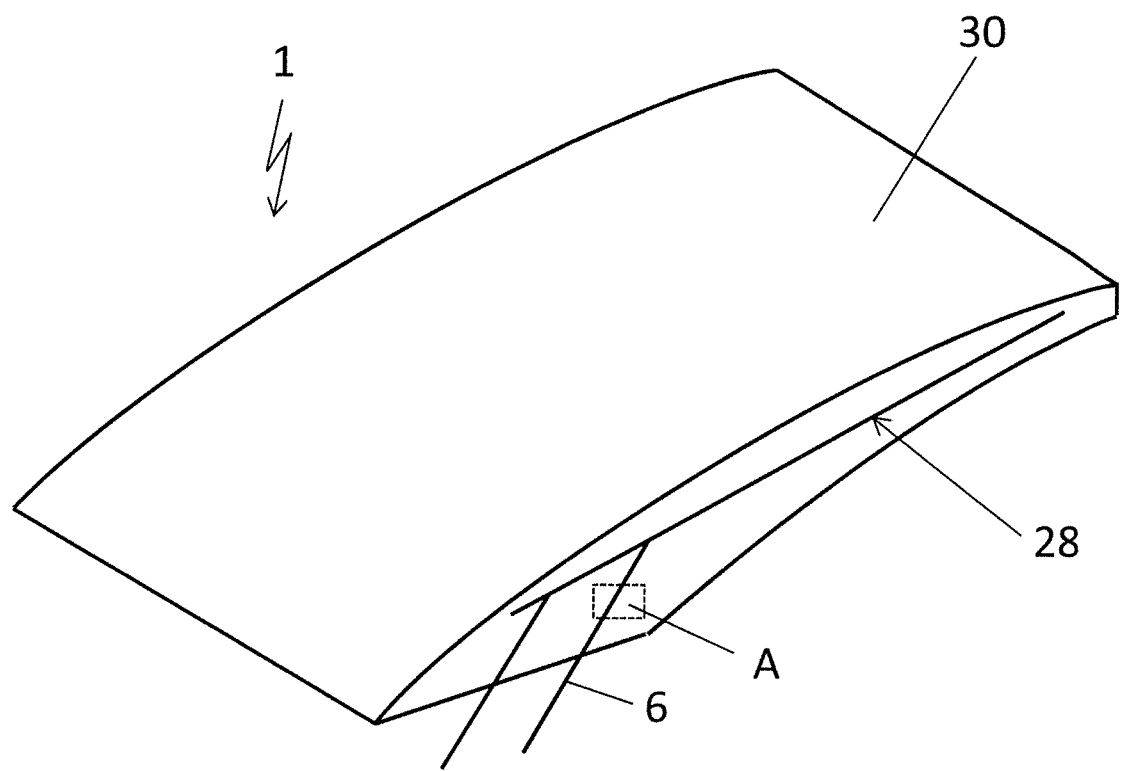
FIG. 1 shows a schematic perspective side view of the top according to the invention.
Figure 2:
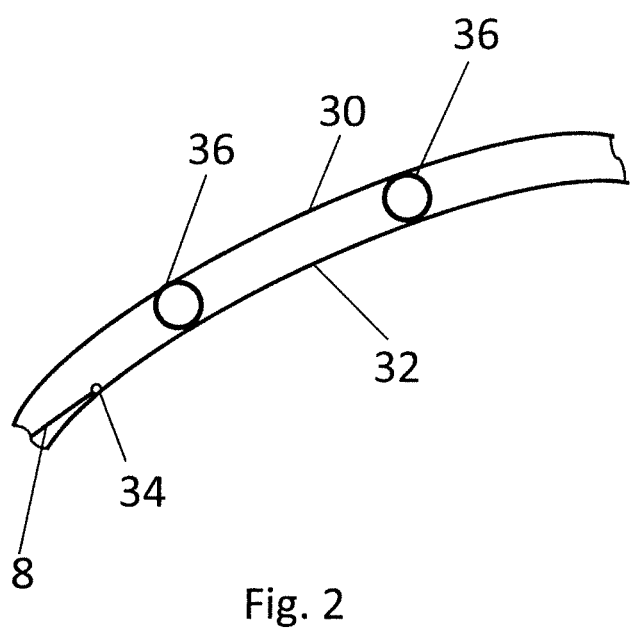
FIG. 2 shows a highly schematized longitudinal section through the top of FIG. 1.

FIG. 1 shows a top 1 according to the invention comprising a top linkage and a top cover 30. The top linkage can be displaced between a closed position, in which top 1 covers a vehicle interior, and a storage position. The vehicle interior is uncovered when top 1 is in the storage position. The top linkage has a linkage arrangement 28 on either side of a vertical longitudinal center plane of top 1, each linkage arrangement 28 comprising a link 6 having a cut-out 18, link 6 being a main link which is part of a main multi-bar linkage of linkage arrangement 28. The two linkage arrangements 28 are connected to each other via transverse bows 36 extending in the vertical direction of the vehicle.

Figure 3:
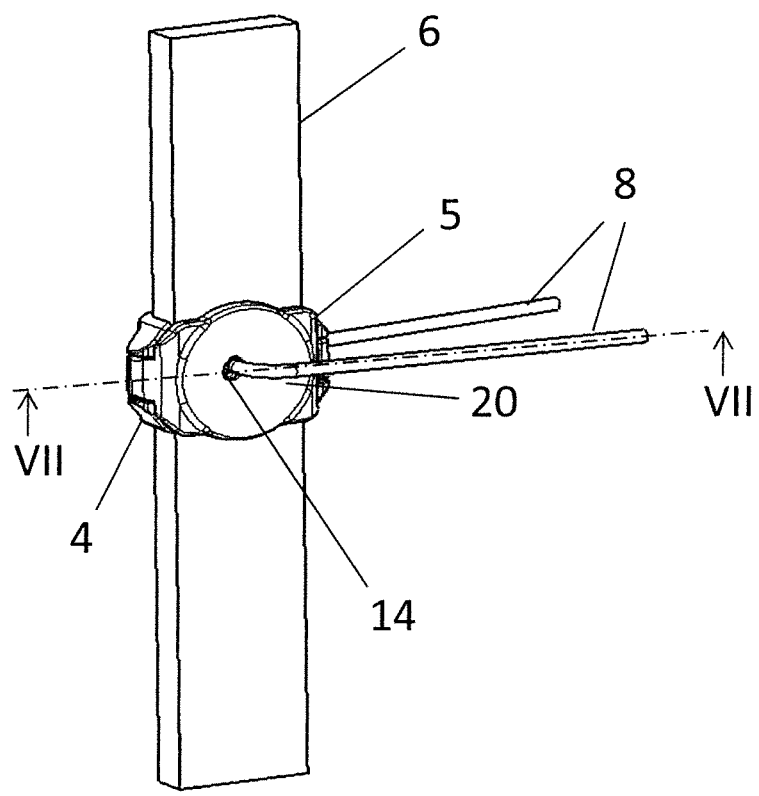
FIG. 3 shows a perspective detail view of section A in FIG. 1.
Figure 4:
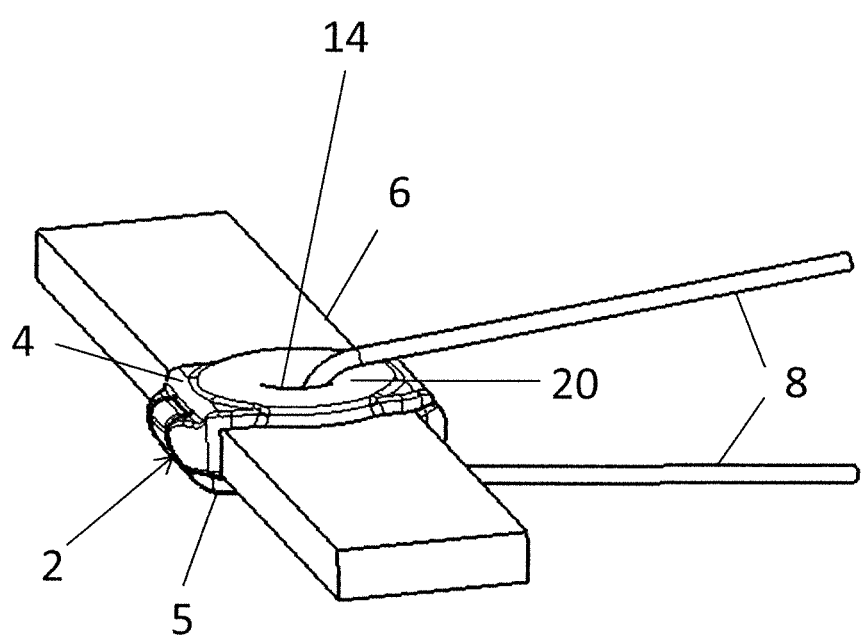
FIG. 4 shows another perspective detail view of section A in FIG. 1.

As shown in FIGS. 3, 4 and 7, a cable guide 2 having a passage opening 14 for guiding a tension cable 8 is disposed on link 6, tension cable 8 serving to tension a headliner 32 in the closed position of top 1. Tensioning cable 8 runs through passage opening 14, whereby it is deflected between a connection point on the top linkage and a connection point 34 on headliner 32.

Cable guide 2 comprises two shells 4 and 5. The two shells 4 and 5 are in contact with link 6 from opposite sides, enclosing link 6 in the transverse direction of link 6. Cylindrical portions 16 of shells 4 and 5, which define a passage opening 14 for tensioning cable 8, extend into cut-out 18 in such a manner that their end faces are in full surface contact.

The two shells 4 and 5 are identical parts. For this reason, only one of the two shells 4 and 5 is shown in FIGS. 5 and 6.

Shells 4 and 5 each comprise a latching part 10 and a latching counterpart 12. Latching parts 10 and latching counterparts 12 are disposed on opposite edges of shells 4 and 5. As shown in FIGS. 3, 4 and 7, latching part 10 of shell 4 engages into latching counterpart 12 of shell 5 and latching part 10 of shell 5 is engaged with latching counterpart 12 of shell 4. Thus, shells 4 and 5 are latched or clipped together, whereby cable guide 2 is fixed to link 6.

Portions 16 of shells 4 and 5, which define passage opening 14, form a sliding surface for tensioning cable 8 together with parts of surfaces 20 of shells 4 and 5 that face away from link 6. The sliding surface has low roughness, i.e., it is smooth. Thus, tensioning cable 8 is subject to little to no wear, which reduces the risk of tensioning cable 8 snapping under strain.

Latching parts 10 each comprise a protrusion 24 to which a ramp or an inclined portion 26 is adjacent. Latching counterparts 12 each have a latching lug 22 corresponding to protrusions 24 and being engaged with protrusions 24 in the installed state, shells 4 and 5 thus being connected to each other.

During installation of cable guide 2 on link 6, the two shells 4 and 5 are positioned relative to each other in such a manner that latching part 10 of first shell 4 is located opposite latching counterpart 12 of second shell 5 and latching counterpart 12 of first shell 4 is located opposite latching part 10 of second shell 5 and link 6 is located between the two shells 4 and 5. Once latching parts 10 drive onto ramps 26, latching counterparts 12 are bent by the continued sliding of shells 4 and 5 in the direction of link 6, i.e., toward each other. Upon arrival in an end position, in which the two shells 4 and 5 are in contact with link 6, latching lugs 22 align with corresponding protrusions 24, causing latching lugs 22 to return to their rest position. This means that latching lugs 22 are engaged with protrusions 24 and the two shells 4 and 5 are latched to each other.

Each of the two shells 4 and 5 is an injection-molded plastic part whose surface has low roughness.

REFERENCE SIGNS 1 top
2 cable guide
4 shell
5 shell
6 link
8 tensioning cable
10 latching part
12 latching counterpart
14 passage opening
16 portion of the shell
18 cut-out
20 surface
22 latching lug
24 protrusion
26 ramp
28 linkage arrangement
30 top cover
32 headliner
34 connection point
36 transverse bow

The invention claimed is:

1. A top of a convertible vehicle, the top comprising:
a top linkage which can be displaced between a closed position, in which the top covers a vehicle interior, and a storage position, in which the vehicle interior is uncovered, and which comprises a linkage arrangement on either side of a vertical longitudinal center plane of the top,
each linkage arrangement having a link and an assembled cable guide disposed on the link and wherein each assembled cable guide is configured to slidably guide a tensioning cable, and
wherein each assembled cable guide comprises two shells connected to each other defining a passage opening and being in contact with the link from opposite sides.

2. The top according to claim 1, wherein the link comprises a cut-out, wherein portions of the two connected shells that define the passage opening extending into said cut-out.

3. The top according to claim 1, wherein a portion of the surface of each assembled cable guide forms a sliding surface for the tensioning cable.

4. The top according to claim 3, wherein the sliding surface is curved.

5. The top according to claim 1, wherein the two connected shells are identical parts.

6. The top according to claim 1, wherein the two connected shells are each an injection-molded plastic part.

7. The top according to claim 1, wherein a headliner or a top cover can be tensioned by the tensioning cable.

8. The top according to claim 1, wherein the two connected shells are latched to each other.

9. A top of a convertible vehicle, the top comprising:
a top linkage which can be displaced between a closed position, in which the top covers a vehicle interior, and a storage position, in which the vehicle interior is uncovered, and which comprises a linkage arrangement on either side of a vertical longitudinal center plane of the top, each linkage arrangement having a link and a cable guide disposed on the link and serving to guide a tensioning cable, wherein the cable guide comprises two shells defining a passage opening and being in contact with the link from opposite sides, wherein each of the two shells comprises a latching part and a latching counterpart, the latching part of the first shell engaging with the latching counterpart of the second shell and the latching counterpart of the first shell engaging with the latching part of the second shell.

10. The top according to claim 9, wherein each latching part comprises a latching lug engaging behind a protrusion of the mating latching counterpart.

11. The top according to claim 9, wherein each latching counterpart comprises a ramp, the mating latching lug driving onto said ramp during installation of the cable guide on the link.

\* \* \* \* \*